United States Patent
Humphrey et al.

(10) Patent No.: US 8,024,467 B2
(45) Date of Patent: Sep. 20, 2011

(54) DISTRIBUTED SESSION LISTING AND CONTENT DISCOVERY

(75) Inventors: Brett Humphrey, Redmond, WA (US); Rod Toll, Sammamish, WA (US); C. Shane Evans, Duvall, WA (US); G. Andrew Johnston, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 517 days.

(21) Appl. No.: 11/843,246

(22) Filed: Aug. 22, 2007

(65) Prior Publication Data

US 2007/0288647 A1 Dec. 13, 2007

Related U.S. Application Data

(63) Continuation of application No. 10/185,810, filed on Jun. 28, 2002, now Pat. No. 7,277,946.

(51) Int. Cl.
*G06F 15/173* (2006.01)

(52) U.S. Cl. ........ 709/226; 709/204; 709/220; 709/223; 709/238

(58) Field of Classification Search .................. 709/204, 709/220, 223, 226, 238
See application file for complete search history.

(56) References Cited

U.S. PATENT DOCUMENTS

| | | | | |
|---|---|---|---|---|
| 6,009,458 A * | 12/1999 | Hawkins et al. | ............... | 709/203 |
| 6,560,636 B2 * | 5/2003 | Cohen et al. | ................... | 709/203 |
| 7,177,950 B2 * | 2/2007 | Narayan et al. | ............... | 709/248 |
| 7,383,433 B2 * | 6/2008 | Yeager et al. | ................. | 709/223 |
| 7,493,363 B2 * | 2/2009 | Huitema et al. | .............. | 709/204 |
| 2002/0119821 A1 * | 8/2002 | Sen et al. | ........................ | 463/42 |

* cited by examiner

*Primary Examiner* — Phuoc Nguyen
(74) *Attorney, Agent, or Firm* — Shook Hardy & Bacon, LLP

(57) ABSTRACT

The present invention enables a game server to provide hosting services by connecting the game server device to a peer group, notifying at least one member of the peer group of the availability of the server device, and enabling the server device to accept and respond directly to searches for the hosting services, which are directed at the peer group by one or more gaming client devices. Discovery of peer group gaming content as well as updating such content are also provided by the present invention. The present invention further enables both peer group protocol supported and non-supported devices to interact with and provide the services provided by a peer group.

20 Claims, 7 Drawing Sheets

DISTRIBUTED SESSION LISTING AND CONTENT DISCOVERY

CROSS-REFERENCE TO RELATED APPLICATIONS

This application is a continuation of U.S. application Ser. No. 10/185,810 filed Jun. 28, 2002, now pending, entitled DISTRIBUTED SESSION LISTING AND CONTENT DISCOVERY, is herein incorporated by reference.

STATEMENT REGARDING FEDERALLY SPONSORED RESEARCH OR DEVELOPMENT

Not Applicable.

FIELD OF THE INVENTION

The present invention relates generally to multi-client operation and communication in peer-to-peer networks, and more particularly to a self-supporting homogenous peer-to-peer network cloud of systems that provide two primary services namely a session listing service and a content discovery service.

BACKGROUND OF THE INVENTION

Group communication technologies on the Internet allow users with common interests to collaborate, share files, chat with one another, multi-cast audio and video for presentations and group meetings, and engage in multi-player gaming. Indeed, the ability for group formation on an ad hoc basis presents significant advantages to allow users with common interests to gather in a virtual area or group that may be segregated from the general Internet population thereby facilitating useful discussion and collaboration between such like minded individuals. Currently, however, most group communication and formation takes place in a server centric environment whereby all communication flows to or through large central servers to which individuals may connect to join and participate in the group.

With the reemergence of peer-to-peer (P2P) technology, the current server centric model of Internet communication is quickly being replaced. Indeed, peer-to-peer technologies enable users to contact one another in a serverless environment, free from the constraints of server based Internet communication. In a peer-to-peer based system, a user's anonymity and privacy may be maintained since communication occurs directly between peers within the network. However, while individual communication and file sharing is relatively well established in peer-to-peer networks, discovering/joining and sharing information in a group peer-to-peer environment is not well established. However, individuals have grown accustomed to the benefits provided by such grouping technology in the server centric environment. Therefore, a need exists for technology that allows both the benefits of peer-to-peer technologies and grouping technologies to be realized in the serverless environment that is peer-to-peer.

The use of P2P in the entertainment software industry has been largely limited to content sharing user scenarios. Session listing and content discovery services currently in use typically employ large "farms" of servers that support the load of large numbers of clients using those services. This approach has an extremely high cost to the owner of the service both in terms of computer hardware, communications bandwidth, facilities costs and human resources.

In light of the foregoing, there exists a need for a system and method that enables client systems to locate, configure and launch sessions with other client systems. For example, gamers need to find, configure and launch multi-player games with other players. There also exists a need for notification of players when content, such as game patches, updates or other content is available to download based on a player's installed games and user provided preferences. Furthermore, game vendors need to be able to develop highly customized user experiences within games while avoiding designs that require large scale server farms built upon monolithic persistent data repositories.

SUMMARY OF THE INVENTION

The present invention is directed to multi-client operations and communications in peer-to-peer networks, and more particularly to a self-supporting homogenous peer-to-peer network cloud of systems that provide two primary services, namely a session listing service and a content discovery service, utilized to provide game hosting services.

The present invention enables a game server to provide hosting services by connecting the game server device to a peer group, notifying at least one member of the peer group of the availability of the server device, and accepting as well as responding directly to searches for the hosting services, which are directed at the peer group by one or more gaming client devices.

The present invention further provides certification of the game server device and compliance with load balancing requirements for the peer group, prior to allowing the game server device to join the peer group.

Further, the present invention provides support for game server devices that are unsupported by the protocol of the peer group and enables participation within the peer group, by such devices.

Even further, the present invention provides a system and method for discovering content material pertaining to a peer group such as game titles, through a somewhat similar process of certification and connection to a peer group as described earlier. Content discovery in a peer group is available to both protocol supported and unsupported client gaming devices.

Further still, the system and method of the present invention enables the update of gaming content material in a peer group, such as patches and news information. The updates are propagated to all members of the peer group when provided by a protocol supported or unsupported authorized content distributor system.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means, instrumentalities and combinations particularly pointed out in the appended claims.

BRIEF DESCRIPTION OF THE DRAWINGS

The present invention is described in detail below with reference to the attached drawing figures wherein.

DETAILED DESCRIPTION OF THE INVENTION

The present invention relates generally to multi-client operations and communications in peer-to-peer networks, and more particularly to a self-supporting homogenous peer-to-peer network cloud of systems that provide two primary services, namely a session listing service and a content discovery service. For instance, the invention enables developers of game software to easily build applications that make up a stable, self-supporting homogenous peer-to-peer (P2P) network "cloud" of systems that provide game session listing and content discovery. The game session listing service allows the client application to connect to and communicate with an arbitrary number and member of homogenous game sessions i.e. the same general game title. Once connected, the game client can begin play or engage in a search of all cloud members based on a user or application specific criteria. The content discovery service enables the sharing of a common index of content that is relevant to all members of the cloud. The shared content index may contain news items, Uniform Resource Locators (URL) to software updates, or arbitrary data. Each cloud can be managed by an owner that has administrative privileges to the shared index, thus being able to edit or update the index shared by all cloud members.

Having briefly described an embodiment of the present invention, an exemplary operating environment for the present invention is described below.

Exemplary Operating Environment

Figure 1:
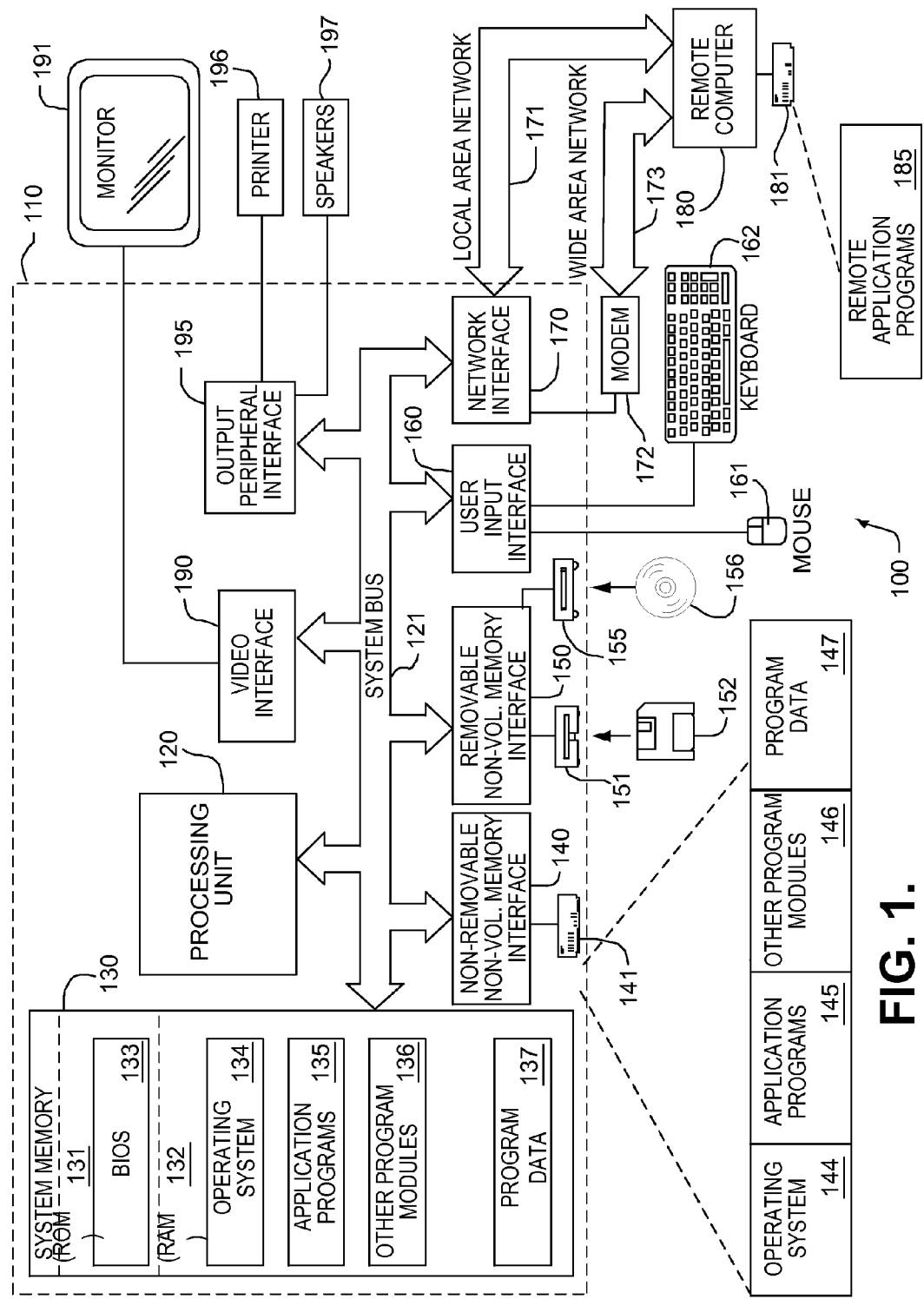
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. Examples of computer storage media include, but are not limited to, RAM, ROM, electronically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system, or necessary portion thereof, from the hard disk drive 140 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

Distributed Session Listing and Content Discovery

By way of example and not limitation, the present invention will be described with reference to distributed game services within a particular implementation of the peer network. It is anticipated and within the scope of the present invention that the description herein is equally applicable to any storage on a searchable network of systems that enable any form of remote software collaboration, as well as, the automated updating of lists of any type of information that can be encoded such as in XML.

As introduced above, the success of a peer-to-peer (P2P) protocol depends on the protocol's ability to establish valid connections between selected entities. Likewise, the formation of groups in such a P2P network relies on this ability. Because a particular user may connect to the network in various ways to various locations having different addresses, a preferred approach is to assign a unique identity to the user or the group, and then resolve that identity to a particular address or addresses through the protocol. Such a peer-to-peer name resolution protocol (PNRP) to which the methods of the instant invention find particular applicability is described in co-pending application Ser. No. 09/942,164, entitled Peer-To-Peer Name Resolution Protocol (PNRP) And Multilevel Cache For Use Therewith, filed on Aug. 29, 2001, and in co-pending application Ser. No. 09/955,924, entitled Peer-To-Peer Name Resolution Protocol (PNRP) Group Security Infrastructure And Method, filed on Sep. 19, 2001, the teachings and disclosure of which are hereby incorporated in their entireties by reference thereto. However, one skilled in the art will recognize from their following teachings that the methods of the present invention are not limited to the particular peer-to-peer protocol of these co-pending applications, but may be applied to other protocols with equal force. Likewise, co-pending application Ser. No. 10/134,780, entitled Peer-To-Peer Name Resolution Protocol (PNRP) Security Infrastructure And Method, filed on Apr. 29, 2002, describes an underlying security infrastructure that ensures that the identities of the various entities within the network are valid, without unnecessarily burdening the network with excess traffic, the teachings and disclosure of which are also incorporated in their entireties by reference thereto.

As discussed in the above incorporated co-pending application describing the PNRP and to provide some useful background, establishing peering relations between individual peers is an expensive process in existing peer-to-peer networks. In the PNRP, however, each node accumulates a routing table that contains a list of references to other nodes in the network. For each node entry, address information, which may include a node identification, address, the key of the node, and the distance between the key of this node and the key of the local node are obtained. Each time the local node learns about a remote node, it checks whether the node is already known, and if not whether to enter an entry in the routing table. Each entry has an 'ideal cache level' determined by its 'distance' from the cache owner. New entries may only be added to the cache level corresponding to their distance, or to the lowest level if the entry's 'ideal cache level' has not been reached yet.

For communication between individual peers in PNRP, when a node receives a query it searches for the entry in its routing table whose key best matches the target, excluding the nodes that have already been visited. The query is then forwarded directly to the node that advertised the entry. If there is no adequate entry, the request is sent back to the node from which the request was received; this node will try another entry in its own routing table. The request is successful if it reaches the entry whose key matches the target. It is unsuccessful if the target is not reached in the maximum number of steps, or if the node from which the request was received tries all possible neighbors and receives a negative response. In the case of successful requests, the response is relayed by all intermediate hops. It carries the address of the node that held the target key, and this entry can be inserted in the routing tables of the intermediate nodes.

Figure 2:
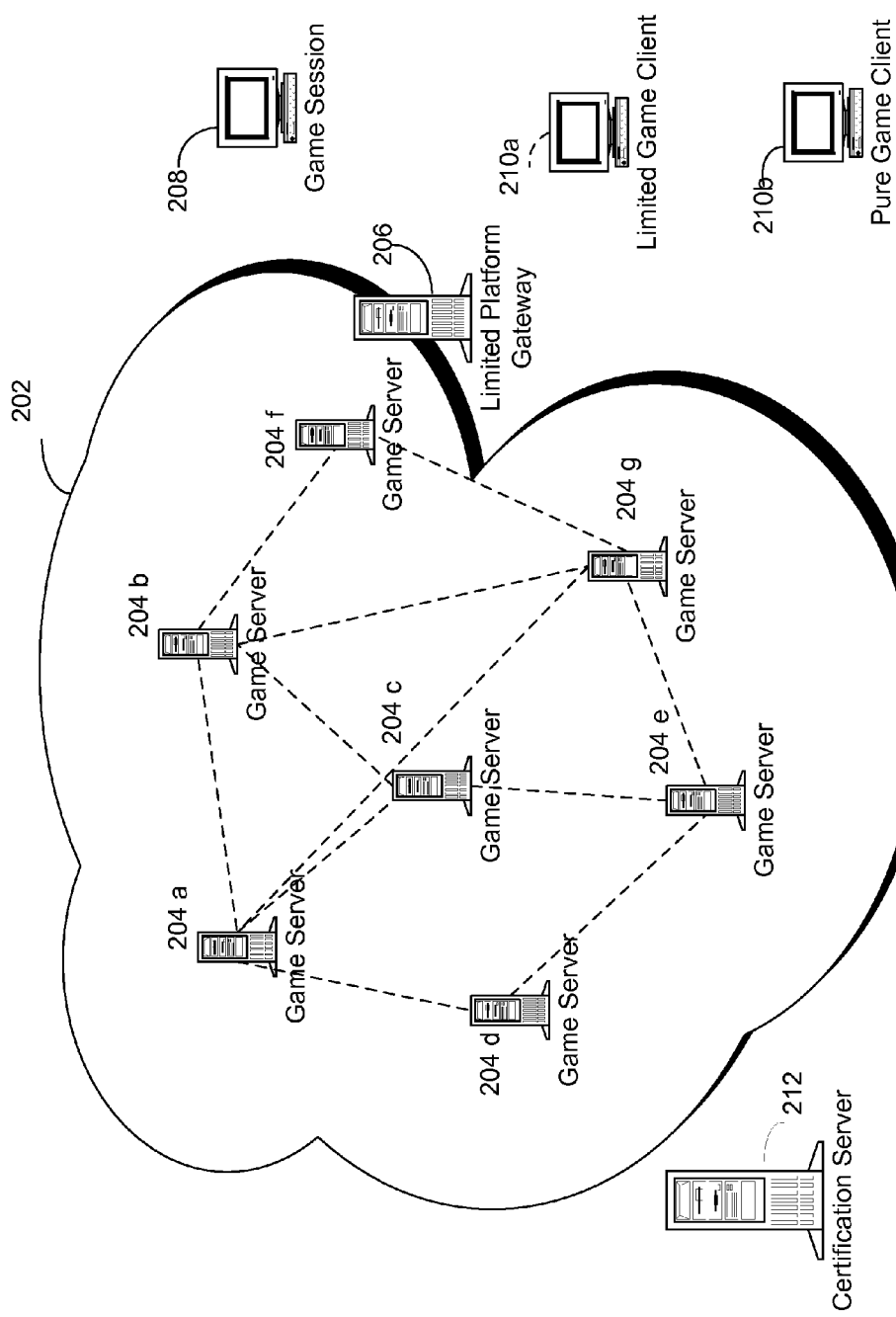
FIG. 2 is a network architectural diagram illustrating an environment of a session cloud and various other components.

Having provided a background on a particular peer-to-peer network, PNRP, we turn next to the particular environment of the present invention as illustrated in FIG. 2. FIG. 2 illustrates an example of a suitable network environment 200 in which the present invention may be implemented. The network environment 200 is only one example of a suitable network environment and is not intended to suggest any limitation as to the scope of use or functionality of the invention. Neither should the networking environment 200 be interpreted as having any dependency or requirement relating to any one or combination of components illustrated therein.

As shown in FIG. 2, there is a certification and load balancing server 212, a cloud 202 comprising game servers 204A through 204F and generally referenced as game servers 204, along with a limited platform gateway (LPG) 206. Also shown are a game session 208 and a game client 210. The session cloud 202 is a collection of systems sharing a common set of information or enabling the sharing of individual pieces of information between members of the cloud. In an embodiment of the present invention the PNRP is utilized to build clouds that collectively service tens of thousands of game servers and potentially millions of client machines. The session cloud 202 is a peer network group to which all game servers relevant to the cloud belong. A cloud as used herein is a homogenous grouping wherein all members are servers or game hosts for a single game title. Multiple clouds can be spawned to scale and load balance in the event that extremely large numbers of sessions are required to be listed simultaneously. Furthermore, it would be understood that the session cloud 202 is composed of a variable number of nodes and that each node has a unique identifier and is able to leave or join the session cloud 202 at various times. Further details on the behavior and characteristics of the cloud 202 will be discussed with reference to the particular protocol that is utilized in an embodiment of the present invention.

For purposes of illustration, a game session 208 that becomes a member of the session cloud 202 is designated as game server 204. A game server 204 as shown is one example of a game session. A game session incorporates many aspects, such as an instance of a persistent game server for a client server title game or an open peer-to-peer staging area for a peer-to-peer title that requires that all players launch the session simultaneously or an instance of a peer-to-peer session that allows new players to join at any time. Game sessions retrieve certificates from the certification server 212, which grants them rights to join the session cloud 202. By joining the session cloud 202 and conforming to the necessary protocol, a game server 204 implicitly lists itself as available to host players.

A game client 210 is able to communicate with a game server 204 in order to participate in particular gaming activities. The steps and method by which a game session 208 connects to and becomes a member of a session cloud 202, thus becoming a game server 204 will be described with reference to FIGS. 3A and 3B. The method and steps for a game client 210 to then connect to the session cloud 202 will also be discussed with reference to FIG. 4.

The certification server 212 is a system that could be running within a data center or within the operations of an umbrella of a participating software vendor or publisher. The certification server 212 is responsible for granting authorization certificates to game sessions 208 in order to provide them access to the session cloud 202 so that the game sessions 208 can become servers 204. Certificates can be granted based on authentication through a system such as Passport. Furthermore, the certification server 212 can also provide load balancing for the session cloud 202. The certificate server can thus monitor and controls access to a session cloud 202 based on cloud membership count.

The service of session discovery entails data flow from the session cloud 202 to clients 210 in a pull model. In operation, a game session 208 or other open peer-to-peer session advertises an available game session by joining a game session peer session cloud 202. The session cloud 202 is potentially one that game clients 210 will query in order to find games that are accepting new players. A game session 208 must first then be available as a member of a session cloud 202, by becoming a game server 204. Game clients 210 will then be able to access the game server 204 when they query the session cloud 202. The process of adding a game session 208 to the network cloud 202 is shown and discussed with reference to FIG. 3.

Figure 3A:
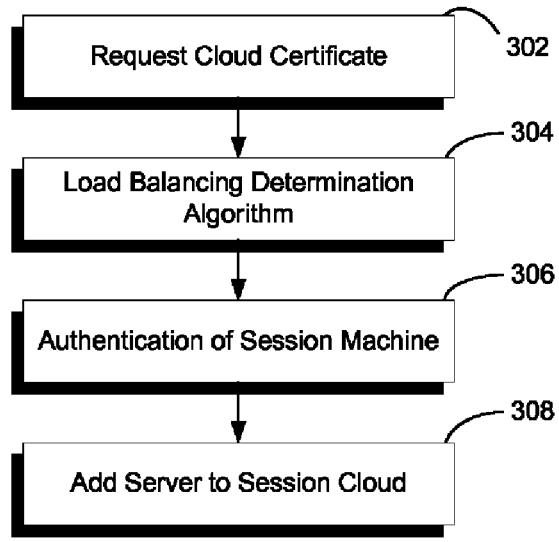
FIG. 3A is a flow diagram illustrating the steps of adding a server or session to the network cloud of FIG. 2.

As shown in FIG. 3A a request is made by a game session 208 for cloud certification, at step 302. For example, when a player chooses to set-up a multi-player game, the game software registers an available session by joining a session listing peer cloud and registering its identity according to the cloud protocol. In an embodiment of the present invention PNRP is utilized. As previously discussed, PNRP is the protocol that enables the discovery of internet resources by name, using name resolution by interconnected peers rather than the standard centralized Domain Name Server (DNS) approach. In other words, PNRP could be thought of as a self describing distributed DNS.

In response to the request for cloud certification, one of any number of known algorithms are implemented to determine and facilitate load balancing, as well as proper authentication and certification, at step 304. The details for such algorithms can be found in one of the previously identified patent applications. At step 306, there is an authentication of the session machine 208. Once certification is granted at step 306 and the load balancing of step 304 has determined than a particular session cloud 202 can be joined by the current game session 208. The next step is to actually add the game session 208 to the cloud thus creating a game server 204, as shown at step 308. In an embodiment of the present invention the process of joining the cloud at step 308 depends on whether or not the particular system of game session 208 is one that is capable of directly supporting PNRP. This variation will be discussed with reference to FIG. 3B.

Figure 3B:
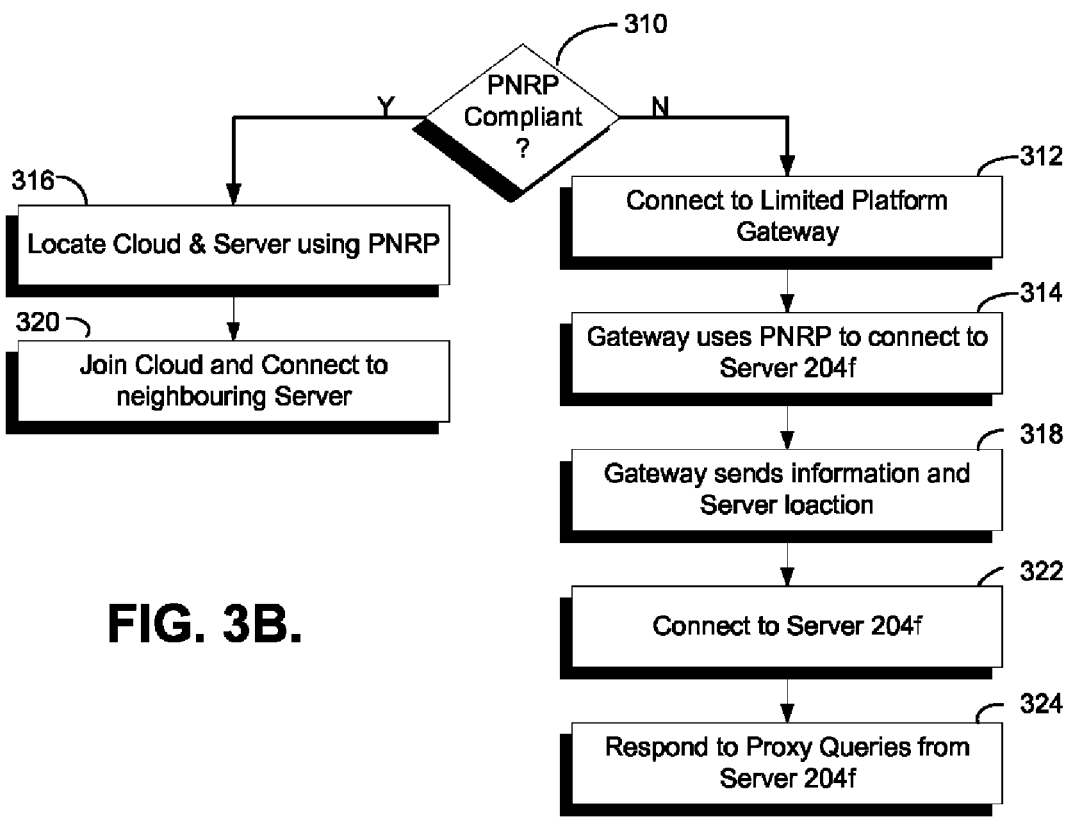
FIG. 3B is a flow diagram illustrating the details for handling PNRP and non-PNRP compliant server additions to the network cloud of FIG. 2.

For the purpose of supporting legacy systems and non-PNRP compliant session systems, the system and method of the present invention incorporates a limited platform gateway 206 that can be utilized by non-PNRP compliant game sessions. FIG. 3B illustrates the connection steps for both a PNRP and non-PNRP compliant game session. At step 310 an inquiry is made as to whether or not game session 208 is PNRP compliant. In the event that the games session 208 is PNRP compliant, the game session 208 utilizes PNRP to find a session cloud 202 at step 316. A particular game server 204 such as game server node 204F is located and the game session 208 then joins the session cloud 202 and makes a connection to that server at step 320.

In the case of a non-PNRP compliant game session, there is an initial communication with a Limited Platform Gateway (LPG) 206, at step 312. The LPG 206 then uses PNRP to communicate to a particular node within the session cloud 202 such as game server 204F and obtains an IP address for that node, at step 314. At step 318, the LPG 206 communicates the location of Game Server 204F in the form of an IP address along with other ancillary information, back to the game session 208. Armed with a specific location, the game session 208 is then able to connect to the game server 204F at step 322. A non-PNRP compliant game session 208 cannot become a member of the session cloud 202. Instead, the particular game server 204F that was involved in the communication with the non-PNRP game session 208 becomes a proxy node for the game session 208. In other words, game server 204F knows about game session 208 and when a search comes along game server 204F responds to queries pertaining to information that is on non-PNRP game session 208. At step 324, the non-PNRP compliant game session responds to proxy queries from game server 204F. Conversely, a PNRP compliant game session 208 is able to join session cloud 202 and connect to neighboring game servers 204 and is able to respond directly to any queries.

A second component of the peer-to-peer session cloud 202 is the ability for client systems 210 or client applications to connect to the session cloud 202. In an embodiment of the present invention the term client application defines an instance of a game title that has the ability to find and interact with game sessions (i.e. game servers 204) that exist within session clouds. As with games sessions, clients also can be PNRP or non-PNRP capable. In essence, a client 210 uses PNRP to find one or more game servers 204 within a cloud that is topologically nearby. A client 210 can simply join a retrieved server node or use a retrieved node as a proxy to begin a distributed search for other sessions within the cloud.

Generally, a certificate is required to begin a search. The use of a certificate mitigates the possibility of flooding the cloud with multiple redundant search requests. Each certified request incorporates a return address to which responses should be directly sent. A search request is passed between cloud peers, and ripples through the cloud, generating responses. Responses are sent directly by an individual game server 204 to the requester client 210 when the session matches the client's search criteria.

Figure 4:
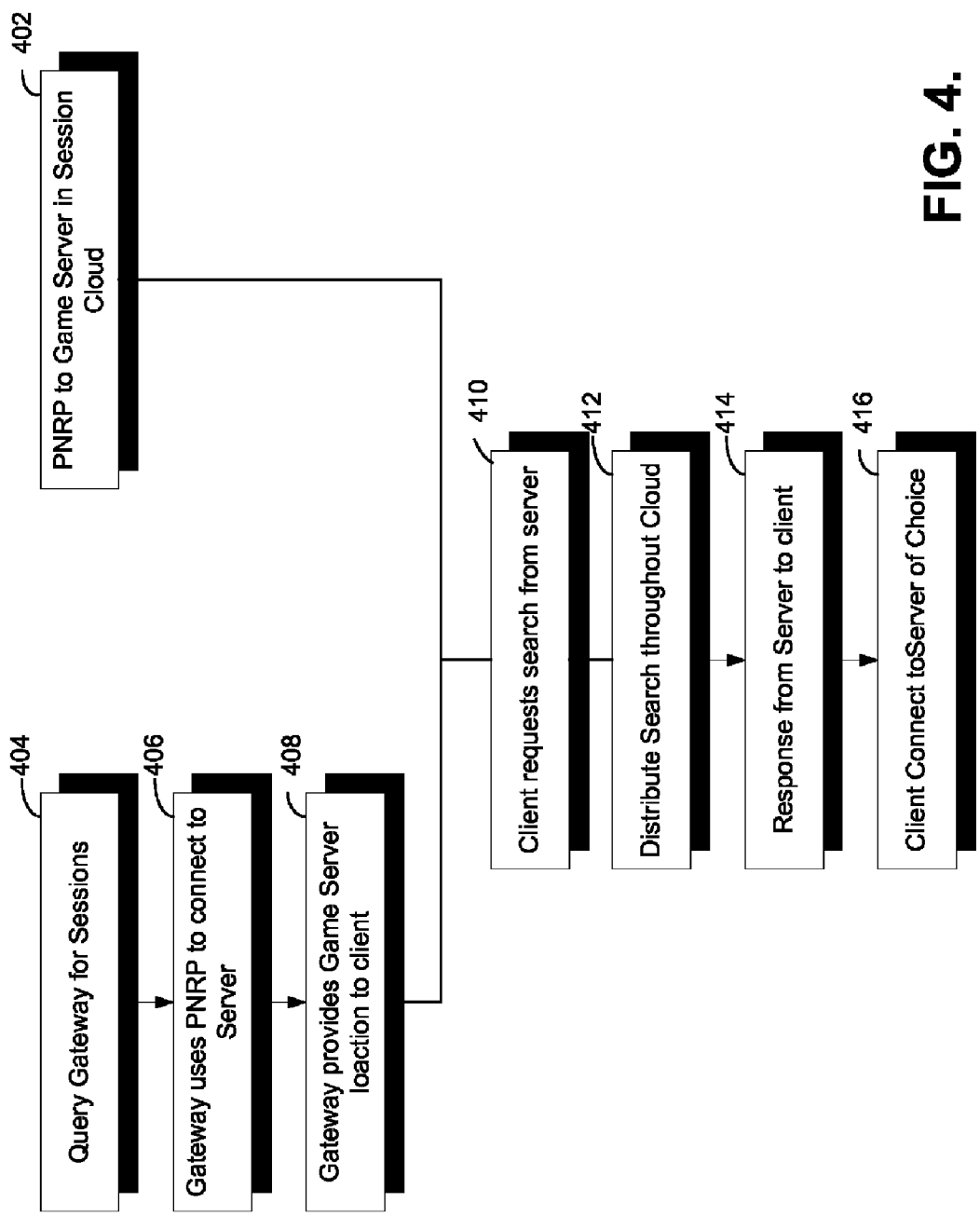
FIG. 4 is a flow diagram illustrating the steps for connecting a client system to the network cloud of FIG. 2.

FIG. 4 illustrates the process for a non-PNRP client 210 otherwise referred to as a limited client 210A. Also shown in FIG. 4 are the steps and process for a PNRP compliant client, otherwise referred to as a pure client 210B. At step 402, a pure client 210B locates a topologically close game server 204 that is within the session cloud 202 and queries it for available gaming sessions. On the other hand, a limited client 210A must first query a gateway (LPG 206) for available sessions, at step 404. LPG 206 then utilizes PNRP to connect to a topologically close game server within the session cloud 202 at step 406. LPG 206 provides the location of the game server 204 to which it specified its session search, to the limited client 210A at step 408. With the information of the server location available to the limited client 210A, the client is then able to request a session search from that game server 204 at step 410. At this point, the process is similar for both the limited client 210A and the pure client 210B. In other words, once the request has been made to a game server 204 that is within the session cloud 202, the game server 204 is able to distribute the search throughout the cloud, at step 412. In response to the distributed search relevant servers within the session cloud 202 are able to then respond directly to the client 210. Included in the response from a server 204 to a client 210 is the location of the server 204. As such, the client 210 is then able to connect the server 204 of choice at step 416 regardless of whether the client 210 is a limited client 210A or a pure client 210B.

Figure 6:
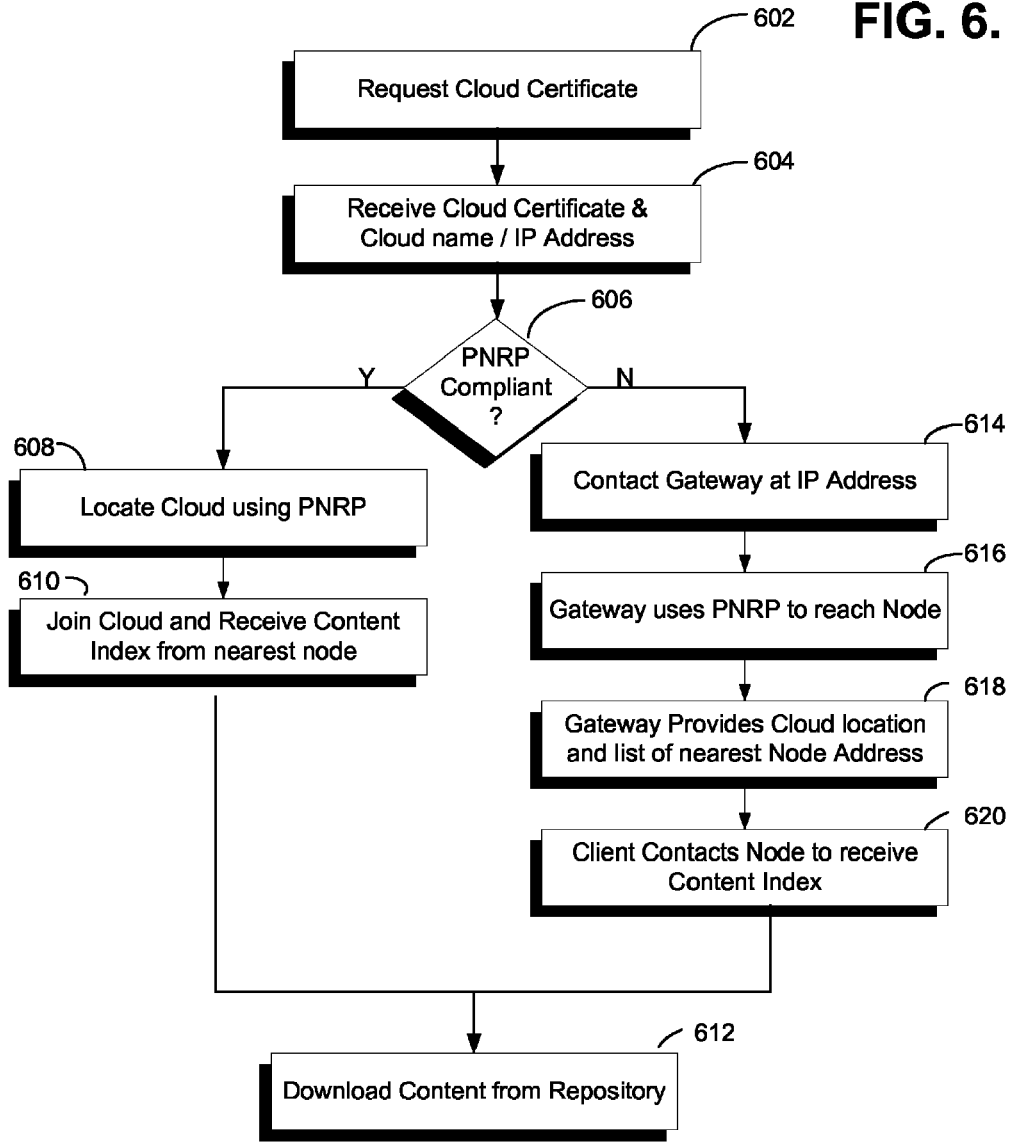
FIG. 6 is a flow diagram illustrating the steps for the discovery of content by a client system.
Figure 7:
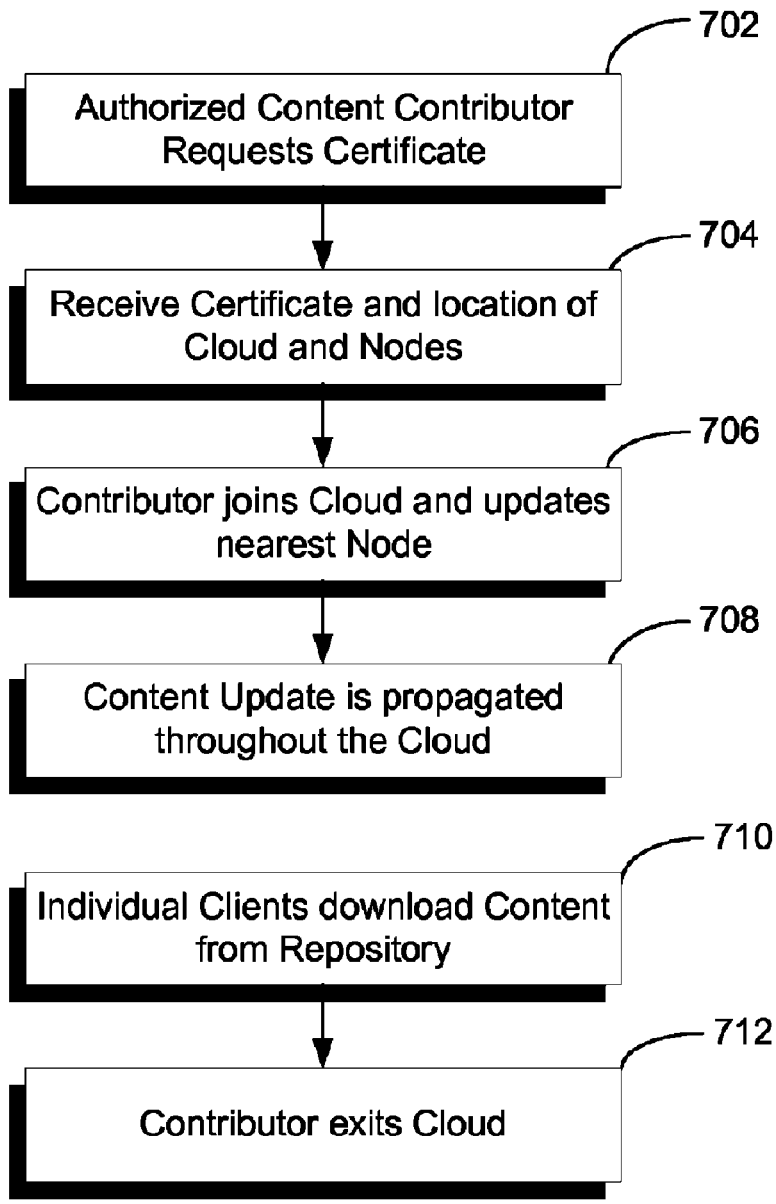
FIG. 7 is a flow diagram illustrating a process for updating content within a content cloud.

In a further embodiment of the present invention a content delivery service is provided in which data flows to clients in a push model. In this further embodiment, clients make up the cloud and share a common, synchronized index of content that is available for download from any one of a number of sources provided by a content owner. A content owner or provider can be an Internet Service Vendor (ISV) that is providing game patches, updates or modifications or other content. It is also conceivable that other content providers such as online magazine publishers may utilize the present invention to disseminate news information. The content delivery service will be explained and discussed with reference to FIGS. 5, 6 and 7. Network connections and components exemplary for a content delivery service are illustrated in FIG. 5, while the process and steps of an embodiment of the invention are illustrated in FIGS. 6 and 7.

Figure 5:
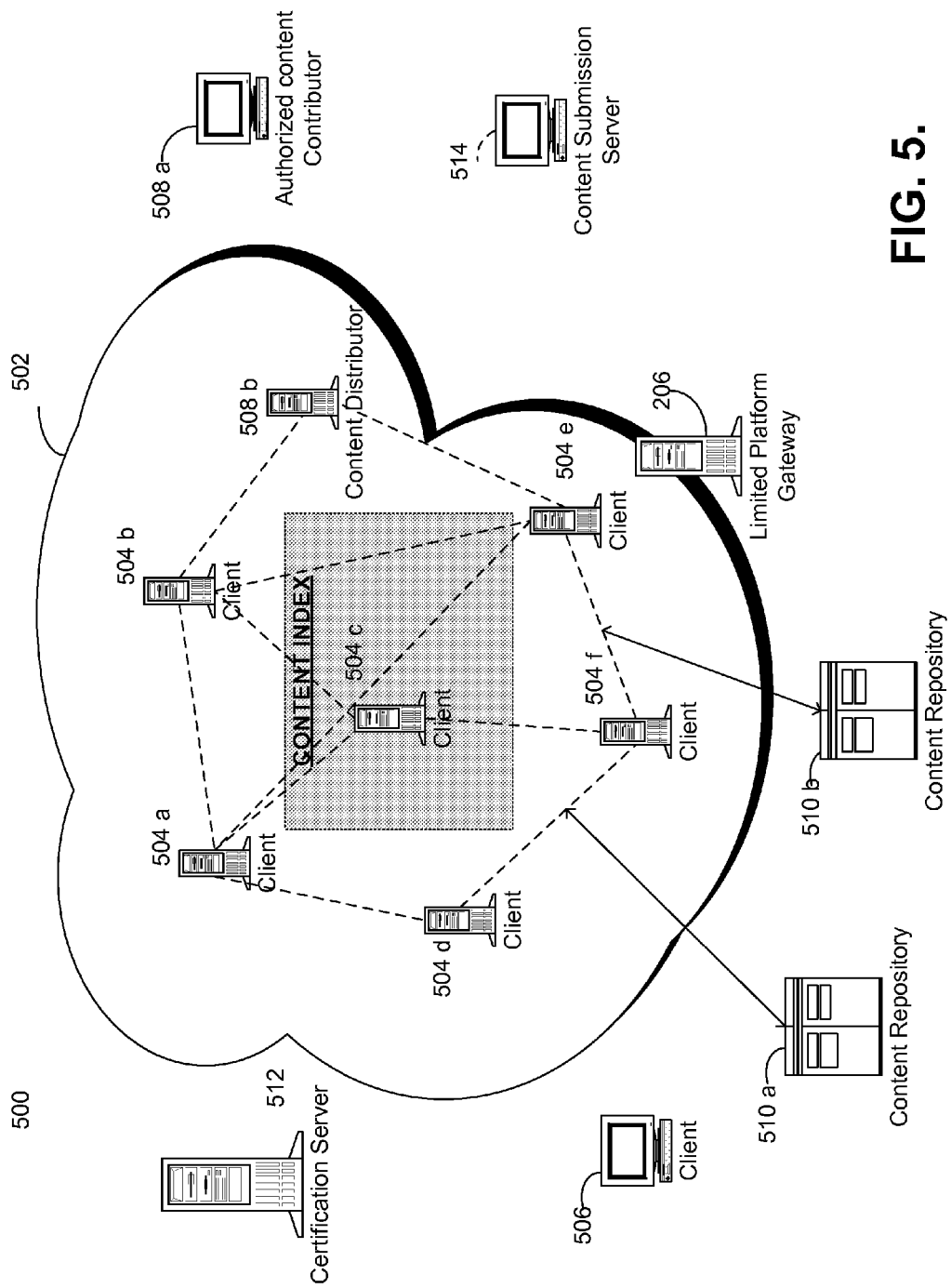
FIG. 5 is a network architectural diagram illustration interactions for content discovery components and a content cloud.

FIG. 5 illustrates an exemplary network environment and components for the content discovery service within the present invention, referenced as discovery network 500. The discovery network 500 is only one example of suitable components and a network environment, and is not intended to suggest any limitation as to scope of use or functionality of the invention. Neither should the invention be interpreted as having any dependency or requirement relating to any one or combination of components illustrated in the exemplary discovery network 500.

As shown in FIG. 5, there is a certification and load balancing server 512, a content cloud 502 comprising cloud member clients 504A through 504F, along with a limited platform gateway (LPG) 206. Also shown are a non-member client 506, an authorized content contributor 508, content repositories 510a and 510b, and a content submission server 514. A content index 516 is illustrated to represent the shared, pooled index of the content cloud 502 member clients 504.

The content cloud 502 is a peer-network group of clients seeking content that is relevant to the cloud. In operation, multiple content clouds will be running on the Internet simultaneously, trafficking content indices specific to a particular subject matter such as a game title or other arbitrary category. Like session clouds 202, content clouds 502 can target specific game titles though the types of content entries can differ. Examples of individual content index entries can fit into one of several categories such as patches, game content updates or news. It is also feasible to have multiple content clouds 502 for a particular category. In such a case, the content clouds 502 are spawned to scale and load-balance in the event that there is a need for simultaneous access by large numbers of clients 504.

The certification and load-balancing server 512 is similar to the certification server 212 used with session cloud 202. However, in this instance, certification and load-balancing server 512 grants additional certificate types such as client cloud access certificates, content submission certificates and limit gateway certificates. Client cloud access certificates are requested and granted to enable a client 504 to join a content cloud 502 for a particular content segment, such as a game title. Content submission certificates are requested by and authorized to content contributors 508 to allow connection to the content submission server 514, for the purpose of editing or adding entries.

The content index 516 or catalog is a record set shared by all members of the content cloud 502. The content index 516 contains reference to and locations of content. In operation, new cloud members are pushed the content index 516 when they first join the cloud and receive deltas (changes to content index) as ripples through the content cloud, when updates are made available by the content contributor. Issues relating to content cloud 502 stability and performance are addressed through the size of content record sets and update frequency. In some cases the content index 516 is cached locally on individual clients 504. Such clients 504 then receive the deltas between their copy and the content cloud 502 copy.

A content contributor 508 for the purpose of the invention is one or more people with the authority to edit the content index 516 that is shared by the peers of the content cloud 502. The content contributor 508 accesses the certification and load-balancing server 512 for a content submission certificate. The certificate allows the content contributor 508 to join the content cloud 502 and begin an update ripple that adds, removes or changes entries that are within the content index 516. The use of the certificate restricts changes to the content index 516 to those with proper permission, thus mitigating the risk of unnecessary or inappropriate content being sent to content cloud 502 members.

The limited platform gateway 206 enables a limited set of content discovery services to non-PNRP compliant legacy client systems (otherwise referred to as limited clients). A limited client refers to legacy systems or other non-PNRP compliant systems that are able to take advantage of the present invention and content cloud 502 to obtain content index 516.

Content repository 510 could be a File Transfer Protocol (FTP) server or Web site that contains and is able to deliver the files that are referred to by entries in the content index 516 of the content cloud 502. After a client 504 has obtained information on the location of a particular content, the client 504 is able to directly contact an appropriate content repository 510 to download content to the client 504 machine. The particular steps and process of an embodiment of the present invention for content discovery and download will be discussed next, with reference to FIG. 6. In addition, the process for updating content will also be discussed with reference to FIG. 7.

Turning first to content discovery, a client system 506 essentially registers for content updates by joining one or more content discovery peer clouds 502 and then is able to download content as illustrated in FIG. 6. It should be noted that client systems receive content descriptions rather than the entire files or actual content from the content cloud 502, i.e. a client may receive a record which is a pointer to the location of a file that resides on a content repository 510. In order to join a content cloud 502, a requesting client 506 which is not a member of the content cloud 502 must first request a client access certificate from the certification and load balancing server 212, at step 602. Along with the request, the requesting client 506 provides information on whether or not it is a PNRP compliant node. The certification and load balancing server 212 performs authentication, enables accountability for members of the cloud, and ensures that there are not an excessive amount of cloud member clients 504. Provided that these conditions are satisfied, a cloud certificate is issued to the requesting client 506 at step 604. The information that was provided regarding PNRP compliance or the lack thereof, results in the provision of a cloud name and identity to a PNRP compliant (pure) requesting client 506, or an IP address of a limited platform gateway 206 to a non-PNRP compliant (limited) requesting client 506. Whether the requesting client 506 is a pure client or limited client is determined at step 606 and results in different procedures which culminate at step 612 with the client 506 downloading content from content repository 510.

When the requesting client 506 is a pure client, a PNRP lookup for the content cloud 502 is performed to locate an appropriate node (cloud member client 504). The appropriate node is determined according to the underlying technology of the peer network, for example an algorithm based on the topologically closest node would result in a connection to member client node 504g. Upon locating member client node 504g, the pure requesting client 506 is then able to join the content cloud 502, at step 610. In conjunction with joining the cloud, pure requesting client 506 receives a copy of the larger stored content index 516 from the member client node 504g. In the case where pure requesting client 506 was previously a member of the cloud, it will receive batch deltas of content index 516 that represent the changes during its absence. With the latest information on content index, this new member to the content cloud 502 is then able to download content from an appropriate content repository 510, at step 612.

On the other hand, when the requesting client 506 is a limited client, since it is not capable of PNRP, it contacts the limited platform gateway 206. The IP address of the limited platform gateway 206 is received from the certification and load balancing server 212, at step 614. The limited requesting client 506 makes a request via the LPG 206 for a catalog from the content cloud 502. In other words, the limited requesting client 506 uses the LPG 206 as a proxy to communicate with the content cloud 502. The LPG 206 utilizes PNRP to identify a node in the content cloud 502 (i.e. member client node 504g, assuming a similar peer network algorithm of closest topological node), at step 616. The location of the content cloud 502 along with the address of member client node 504g is then provided to limited requesting client 506, at step 618. Given location and identity, limited requesting client 506 makes contact and receives from member client node 504g, a copy of the content index 516, at step 620. This scenario varies from that of the pure client in that the limited client cannot become a member of the content cloud 502, and as such cannot communicate with other member client nodes 504a to 504f, but rather just the particular node for which it has an address i.e. member client node 504g. However, as with the pure client, once the limited requesting client 506 has a copy of the content index 516, it is then able to directly download content form a content repository 510, at step 612.

Turning next to content update and/or addition, the general connection and contact process is similar to that of content discovery and will be discussed with reference to FIG. 7. As previously noted, updates to the content cloud 502 are made by authorized content contributors 508. An authorized content contributor 508a requests a certificate from the certification load balancing server 512, at step 702. Included in the request are credentials indicating authorship rights to the index. For example, an ISV would provide verification of ownership to the content index and the right to control changes. In response to the request, a certificate is granted to the content contributor 508 at step 804. In addition, the location of the content cloud 502 and the member client nodes 504b are also provided. Using the received information, the content contributor 508a is able to join the content cloud 502. As a member of the content cloud 502, the content contributor 508 is able to update one or more neighboring nodes, at step 706. As shown in FIG. 5, the member content distributor 508b is able to update the member client nodes 504b and 504e by providing delta updates. Returning to FIG. 7, the update information is then propagated throughout the content cloud 502 at step 708 by the member client nodes 504b and 504e. Because the content index 516 is essentially a collection of pointers to the location of the actual content information, clients must then locate the content repository 510 of interest to download content information, at step 710. The member content distributor 508b is then able to exit the cloud at step 712.

In a similar fashion to the session discovery and content discovery for non-PNRP compliant systems, a non-PNRP compliant authorized content distributor 508 can also effectuate updates or additions to content index 516 by utilizing the limited platform gateway 206 as a proxy in communications with the content cloud 502.

The present invention has been describe in relation to particular embodiments which are intended in all respect to be illustrative rather than restrictive. Alternative embodiment will become apparent to those skilled in the art to which the invention pertains without departing from its scope.

From the foregoing, it will be seen that this invention is one well adapted to obtain all of the ends and objects set forth above, together with other advantages which are obvious and inherent to the system and method. It will be understood that certain features and sub-combinations are of utility and may be employed without reference to other features and sub-combination. This is contemplated by and is with the scope of the claims.

The invention claimed is:

1. A method in a peer-to-peer gaming network computing environment for providing a game hosting service by a game server computing device adapted to communicate with a member game server of a peer group, the game hosting service provided to one or more game client computing devices, comprising the steps of:
   joining the game server computing device to the peer group, wherein the peer group represents a homogeneous grouping of member game servers that each host a particular game title;
   designating the joined game server computing device as one of the member game servers, wherein each member game server of the peer group being another game server computing device previously joined thereto;
   notifying one or more of the member game servers of the peer group that the joined game server computing device is available to operate as part of the game hosting service;
   accepting a search request for the game hosting service, communicated from the one or more game client computing devices, at one of the member game servers that is located topologically proximate thereto, wherein the one or more game client computing devices represent instances of the particular game title embodied on one or more computing devices outside the peer group, and wherein the one or more game client computing devices are configured to employ a protocol of the peer group to identify the topologically-proximate member game server of the member game servers; and
   the topologically-proximate member game server passing the search request to a first node of the member game servers that, in turn, intercommunicates the search request to a second node of the member game servers of the peer group, wherein the search request conveys search criteria and a return address, and wherein, when the joined game server computing device represents the second node that hosts a session of the game hosting service that satisfies the search criteria, the joined game server computing device responding directly to the one or more game client computing devices that communicated the search request via the return address conveyed thereby.

2. The method of claim 1, further comprising:
   first requesting, by the game server computing device, certification to join the peer group; and
   second conforming, by the game server computing device, to acceptable load balancing criteria for the peer group.

3. The method of claim 2, further comprising:
   receiving the certification and connection information to enable the game server computing device joining the peer group to host the particular game title;
   connecting to the one or more client systems interested in the game hosting service of the game server computing device; and
   providing the hosting service to said one or more client systems.

4. The method of claim 3, wherein the notification by the game server computing device includes a plurality of gaming parameters pertaining to the hosting service available on the game server computing device.

5. The method of claim 1, when said joining to said peer group is made by a game server computing device that has no support for a protocol of the peer group, the method further comprising:
   utilizing a gateway computing device to locate the peer group; and
   receiving information from the gateway computing device, by the protocol unsupported game server computing device, regarding the location of one or more member game server nodes of the peer group, said one or more member game server nodes of the peer group being usable, by the protocol unsupported game server computing device, as a proxy node number of the peer group.

6. The method of claim 1, when said connection to said peer group is made by a game server computing device that supports a protocol of the peer group, the method further comprising utilizing said protocol to directly communicate with member game server nodes of the peer group to become a member game server of the peer group.

7. A computing system having a processor, a memory and an operating environment, the computing system operable to execute the method of claim 1.

8. A computer storage medium having computer executable instructions for performing the method of claim 1.

9. A method in a peer-to-peer gaming network computing environment for discovering downloadable content files known to members of a content peer group and of interest to a game client computing device, the method comprising the steps of:
   the game client computing device joining the peer-to-peer gaming network;
   automatically registering game client computing device for content updates upon joining the peer-to-peer gaming network; and
   upon registering to the peer-to-peer gaming network, automatically receiving at the joined game client computing device, without a request therefrom, an index of downloadable content files, wherein the index is pushed from an authorized content contributor and is indirectly propagated via one or more of the members of a content peer group, wherein propagation comprises:
   (a) receiving a copy of the index from the authorized content contributor at a first node of the peer-to-peer gaming network;
   (b) receiving the copy of the index from the first node, via intercommunication between nodes joined to the peer-to-peer gaming network, at a second node of the peer-to-peer gaming network, wherein the second node represents a topologically proximate node to the joined game client computing device, and wherein the joined nodes employ a protocol of the peer-to-peer gaming network to identify the topologically proximate node to the joined game client computing device; and (c) communicating the copy of the index from the second node to the joined game client computing device, wherein said index of downloadable content files includes a reference to and location of downloadable content files residing on one or more content file repositories.

10. The method of claim 9, further comprising:
first requesting, by the game client computing device, certification to join the content peer group; and
second conforming to acceptable load balancing criteria for the content peer group.

11. The method of claim 10, further comprising receiving the certification and connection information to enable access to the content peer group.

12. The method of claim 9, when the game client computing device has no support for the protocol of the content peer group, the method further comprising:
utilizing, by the game client computing device, a gateway computing device to locate the content peer group; and
receiving information from the gateway computing device, by the game client computing device, regarding the location of one or more member nodes of the content peer group, said one or more member nodes of the peer group being usable, by the game client computing device, as a proxy node member of the content peer group.

13. The method of claim 9, when the game client computing device supports a protocol of the content peer group, the method further comprising directly communicating with member nodes of the content peer group and becoming a member of the content peer group.

14. A computing system having a processor, a memory and an operating environment, the computing system operable to execute the method of claim 9.

15. A computer storage medium having computer executable instructions for performing the method of claim 9.

16. A method used by a content contributor within a peer-to-peer gaming network computing environment for updating information relating to downloadable content files known to gaming members of a content peer group, the method comprising the steps of:
requesting certification to access the content peer group and to update a content index shared by members of said content peer group;
receiving the certification upon submitting a proper certificate that indicates the content contributor is allowed to make changes to the content index;
receiving connection information that enables the content contributor to join the content peer group;
connecting to the content peer group;
making changes to the content index; and
automatically updating a downloadable content file index associated with a subject member of the gaming members without a request therefrom by indirectly propagating a batch of deltas to the member, wherein the batch of deltas represents differences between the changed content index and the downloadable content file index, and wherein propagating comprises:
(a) communicating to first member of the gaming members the batch of deltas;
(b) communicating the batch of deltas from the first member, via intercommunication between various gaming members of the content peer group, to a second member of the gaming members, wherein the second member represents a topologically proximate node to the subject member, and wherein the gaming members employ a protocol of the content peer group to identify the topologically proximate node to the subject member; and
(c) receiving the batch of deltas at the subject member from the second member.

17. The method of claim 16, when a game client computing device desires access to the downloadable content file index but has no support for the protocol of the content peer group, the method further comprising:
utilizing, by the game client computing device, a gateway computing device to locate the content peer group; and
receiving information from the gateway computing device, by the game client computing device, regarding the location of one or more member nodes of the content peer group, said one or more member nodes of the peer group being usable, by the game client computing device as a proxy node member of the content peer group.

18. The method of claim 16, when a game client computing device desires access to the downloadable content file index and when the game client computing device supports a protocol of the peer group, the method further comprising directly communicating with member nodes of the content peer group and becoming a member of the content peer group, whereby the downloadable content file index is shared with the game client computing device.

19. A computing system having a processor, a memory and an operating environment, the computing system operable to execute the method of claim 16.

20. A computer storage medium having computer executable instructions for performing the method of claim 16.

* * * * *